US006926825B2

(12) United States Patent
Ardes

(10) Patent No.: US 6,926,825 B2
(45) Date of Patent: Aug. 9, 2005

(54) FLUID FILTER WITH REMOVABLE CENTRAL COMPONENT WITH ADDITIONAL RETAINER

(75) Inventor: Wilhelm Ardes, Ascheberg (DE)

(73) Assignee: Ing. Walter Hengst GmbH & Co. KG, Munster (DE)

( * ) Notice: Subject to any disclaimer, the term of this patent is extended or adjusted under 35 U.S.C. 154(b) by 0 days.

(21) Appl. No.: 10/340,008

(22) Filed: Jan. 10, 2003

(65) Prior Publication Data

US 2003/0098269 A1 May 29, 2003

Related U.S. Application Data

(62) Division of application No. 09/890,588, filed as application No. PCT/DE00/04299 on Dec. 1, 2000.

(30) Foreign Application Priority Data

Dec. 2, 1999 (DE) ...................................... 299 21 168 U

(51) Int. Cl.[7] .............................................. B01D 35/34
(52) U.S. Cl. ....................... 210/232; 210/248; 210/440; 210/441; 210/457
(58) Field of Search ................................ 210/130, 136, 210/234, 248, 437, 440, 441, 442, 455, 457, 232; 285/142.1

(56) References Cited

U.S. PATENT DOCUMENTS

| | | | |
|---|---|---|---|
| 2,407,046 A | 9/1946 | Vokes | 210/415 |
| 3,996,137 A | * 12/1976 | Cooper | 210/130 |
| 4,502,954 A | * 3/1985 | Druffel | 210/136 |
| 4,617,118 A | 10/1986 | Smart | 210/232 |
| 4,887,849 A | 12/1989 | Briet | 285/91 |
| 5,402,954 A | * 4/1995 | Skavnak et al. | 242/336 |
| 5,516,425 A | 5/1996 | Brieden et al. | 210/232 |
| 5,601,710 A | 2/1997 | Yoon et al. | 210/232 |
| 5,727,304 A | * 3/1998 | Eybergen | 29/525.04 |
| 5,922,196 A | 7/1999 | Baumann | 210/232 |
| 6,305,724 B1 | 10/2001 | Sampson | 285/376 |

FOREIGN PATENT DOCUMENTS

| | | |
|---|---|---|
| DE | 3903675 A1 | 8/1990 |
| DE | 29610290 U1 | 8/1996 |
| DE | 19539918 C1 | 2/1997 |
| DE | 19613101 A1 | 10/1997 |
| EP | 612549 A2 A3 | 8/1994 |
| EP | 748646 A2 | 12/1996 |

* cited by examiner

Primary Examiner—Matthew O. Savage
(74) Attorney, Agent, or Firm—Lahive & Cockfield, LLP

(57) ABSTRACT

The invention relates to a fluid filter, especially an oil filter for an internal combustion engine, comprising a filter housing and a central, approximately tubular component which extends into the interior of the filter, said central component engaging in the operating position a projection located on the filter housing and permanently retained in the filter housing, said component being disengageable from said projection and nondestructively removable in said disassembly position from the filter, the component being rotatably mounted around its longitudinal axis within the filter housing, a retaining component (10) being arranged in rotatably restricted fashion within the filter housing, which retaining component in its operating position surrounds and fixes the central component by means of a clamping or locking interference fit, and the central component being rotatable in its disassembly position when the clamping or locking force is exceeded.

17 Claims, 2 Drawing Sheets

FLUID FILTER WITH REMOVABLE CENTRAL COMPONENT WITH ADDITIONAL RETAINER

RELATED APPLICATIONS

This application is a divisional application of U.S. Ser. No. 09/890,588 filed Nov. 21,2001, which is a U.S. National Phase application of PCT International Patent Application No. PCT/DE00/04299 filed Dec. 1,2000, which claims priority to German Patent Application No. DE 299 21 168.1 filed Dec. 2, 1999 in Germany. This international patent application was published in German. The contents of the aforementioned applications are hereby incorporated by reference.

BACKGROUND OF THE INVENTION

The present invention relates to a fluid filter suitable for use in an internal combustion engine.

A conventional fluid filter is shown and described in Utility Model application 299 16 265.

The central component here is provided with lateral wings which contact projections in the interior of the filter housing and in this way rotationally fix the central component. In response to bending or intentional destruction of these wings, the central component may be pivoted into a rotated position around its rotational axis, in which position it is removable.

SUMMARY OF THE INVENTION

The object of the present invention is to further develop a generic fluid filter such that this filter allows for easy assembly and disassembly of the central component, even given greatly varying filter geometries and correspondingly varied installed conditions within the filter housing.

The invention, in other words, proposes two different approaches: On the one hand, it is possible to arrange the central component to be rotationally fixed. For this purpose, the central component is surrounded by a retaining component which in turn is arranged in a rotationally fixed manner within the filter housing. Specifically, in connection with irregularly contoured filter housings, the retaining component may be designed such that it may be mounted only axially in the filter housing and is not rotatable—even rotatable by a few angular degrees. On the other hand, the central component is essentially free to rotate within the filter housing. However, due to the matching contouring between retaining component and central component, the central component is fixed so as not to rotate, or to rotate only to a limited extent, within the filter housing. The central component is axially secured here in the familiar fashion, e.g., by spring-elastic, outwardly projecting engagement hooks which engage the matching projections in the filter housing. Since the projections, as well as the engagement hooks, do not extend around the entire circumference of the filter housing or central component, the central component may be rotated by partially turning it around its longitudinal axis from its operating position to the disassembly position in which its engagement hooks may be axially displaced between two adjacent projections of the filter housing such that the central component may be removed from the filter housing in this disassembly position. The retaining component assembly itself does not need to be additionally fixed within the filter housing: It is movable only in an axial direction, and both components are axially fixed in the axial direction due to the connection with the central component and the axial fixation of the latter, e.g., by means of the above-mentioned spring-elastic claws. The rotational fixation is in turn achieved by appropriate contouring between the central component and the retaining component and the rotationally restricted mounting of the retaining component within the filter housing.

The forces needed to rotate the central component relative to the retaining component from its operating position into the disassembly position are set so high that lesser rotational forces, such as those which occur when the cap of the filter housing is screwed on or unscrewed and which are at least partially transferred to the central component, cannot result in any rotation of the central component relative to the retaining component. If required, it is even possible to provide special keyed surfaces or similar features on the central component such that rotation of the central component relative to the retaining component may be enabled only with the aid of a tool.

An alternative approach of the invention is not to have the central component engage a projection which is provided directly on the filter housing. This approach allows the filter housing to be fabricated inexpensively without the requirement of an undercut. The projection engaging the central component may instead by achieved by an additional retaining component, this retaining component being detachably connected to the filter housing, specifically being advantageously screwed on in combination with the filter housing.

Both of the proposals of the invention for the retaining component may entail a combination component which in addition to having a purely retaining function may also have additional functions and support appropriate functional components or functional assemblies. For example, preassembled valve assemblies may be included in the combination assembly, which valve assemblies have, e.g., permanently integrated valve bodies, while the sealing faces or valve seats matching these valves may be provided in the filter housing such that the valve is assembled in the filter housing along with the insertion of the combination component.

BRIEF DESCRIPTION OF THE DRAWINGS

The following discussion explains two embodiments of the invention based on the drawings.

DESCRIPTION OF ILLUSTRATED EMBODIMENT

Figure 1:
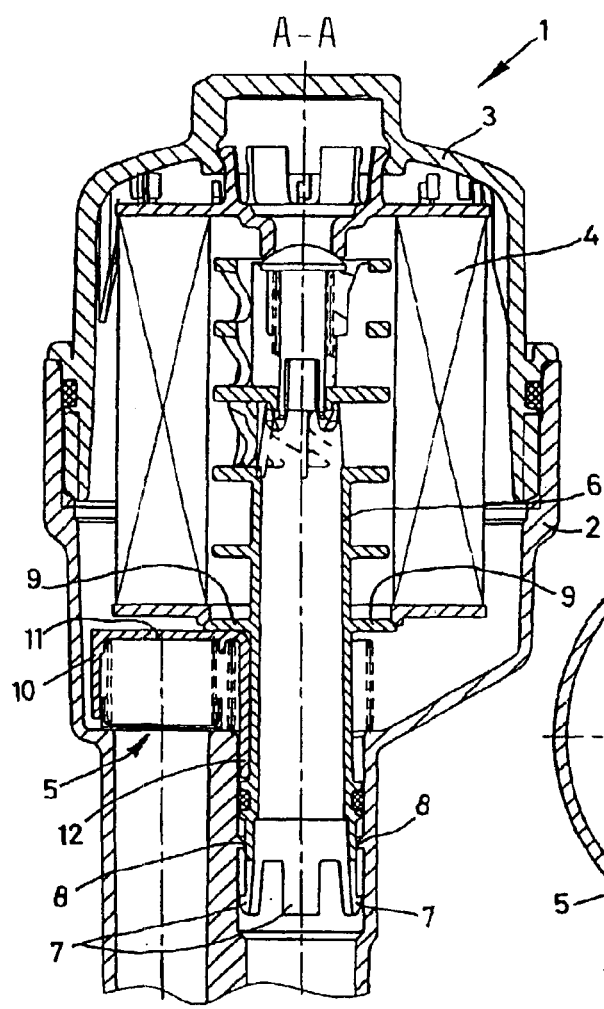
FIG. 1 shows a vertical section through a first embodiment.

Filter 1 in FIG. 1 is a filter having a filter housing 2 and a cap 3 screwed on to filter housing 2, with a replaceable filter insert 4 being provided, including the actual filter medium, for example in the form of a folded filter surface, being provided within filter 1.

Filter housing 2 is designed to be not rotationally symmetrical over its entire length, for example, due to the design restrictions of the crankcase. With certain installed components such as a valve assembly 5, for example filter 1 is thus not freely rotatable around its longitudinal axis within filter housing 2. A central component 6 is provided within filter insert 4. This component is essentially tubular in form but includes recesses which allow filtered oil to flow downward within filter insert 4 to the lubricating points of the internal combustion engine. Central component 6 is designated as a support dome since it prevents the filter material from collapsing under the pressure and temperature conditions occurring during operation. As a result, filter insert 4 is of an inexpensive design which does not require any rigid internal support device for the filter medium.

Figure 2:
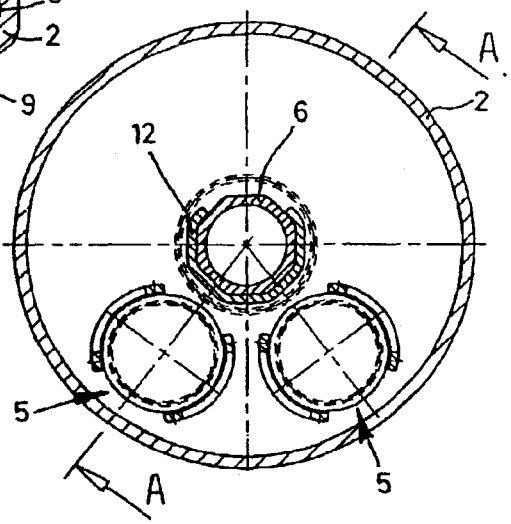
FIG. 2 shows a cross-section of the filter in FIG. 1.

At its lower end, central component 6 has multiple retaining claws 7 each of which engages a projection 8 in filter housing 2. Projections 8 are not designed as one circumferential, annular projection but as individual projections between which spaces are provided. When central component 6 rotates around its lengthwise axis relative to its operating position as shown, retaining claws 7 are allowed to pass through these spaces between projections 8 such that in this rotated position or disassembly position, central component 6 may be removed from filter housing 2. Since central component 6 has a circumferential lower collar 9, valve assembly 5 is held in the position shown by central component 6. Valve assembly 5 here is part of combination component 10 which includes multiple functional elements on base plate 11, e.g., an additional valve assembly 5, as shown in FIG. 2, which is similar or identical in design to the valve assembly shown in FIG. 1. On its base plate 11, combination component 10 additionally has fitting 12 with a roughly C-shaped cross-section. This fitting 12 surrounds central component 6—both the outer contour of central component 6 and the inner contour of fitting 12 being of polygonal design such that an anti-rotational clamping or locking is achieved in which central component 6 is retained within fitting 12, and thus within combination component 10, such that this combination component 10 is also designated as a retaining component.

When the clamping force between fitting 12 and central component 6 is exceeded, the central component may be rotated and assume its disassembly position in which it may be removed from filter housing 2 with retaining claws 7 through the spaces between projections 8. After central component 6 is removed along with its lower collar 9 from filter housing 2, retaining component 10 may also be removed such that, e.g., valve assemblies 5 may be replaced.

The polygonal design of fitting 12 and central component 6 advantageously ensures that after rotation of central component 6 into it disassembly position, this central component 6 automatically retains this rotational position—with the result that manipulation is facilitated, and the user does not need to maintain central component 6 in its rotational orientation of disassembly since this position is maintained automatically.

Figure 3:
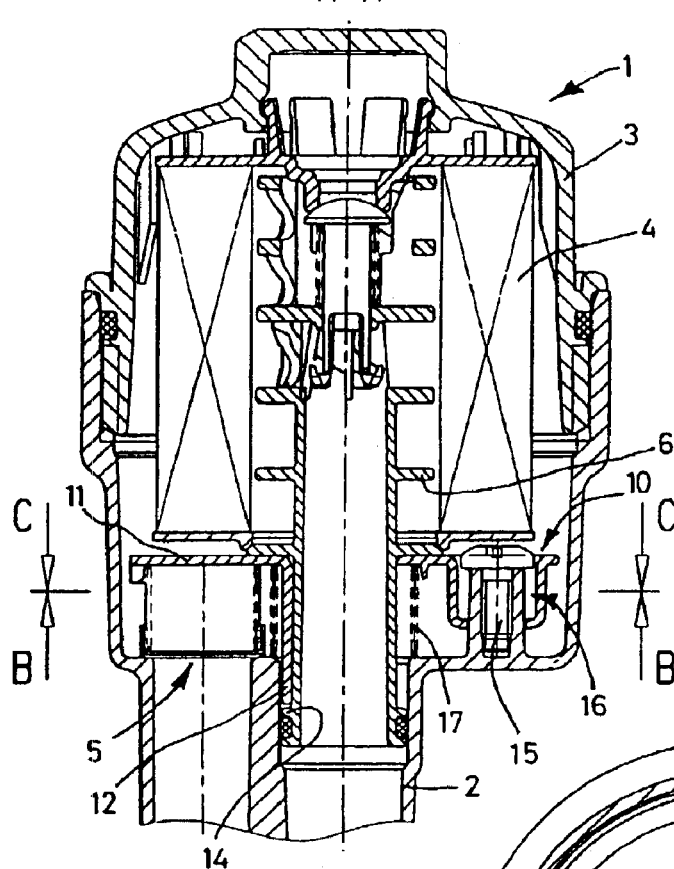
FIG. 3 shows a vertical section through a second embodiment corresponding to lines A—A in FIG. 4.
Figure 4:
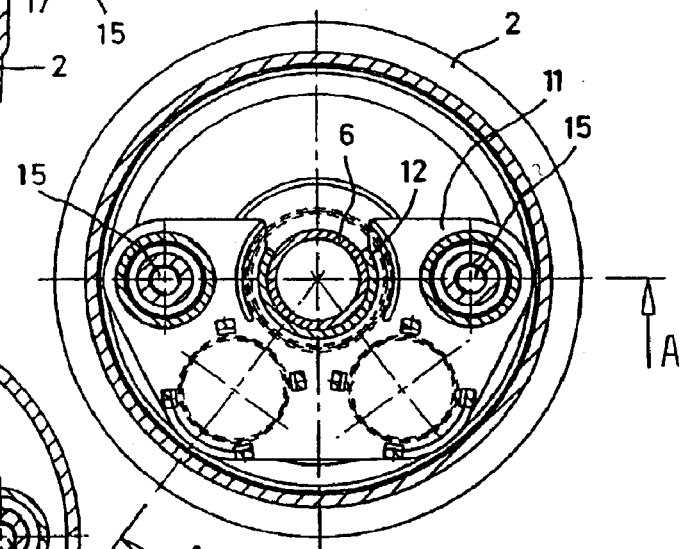
FIG. 4 shows a cross-section of the embodiment of FIG. 3 corresponding to the line B—B in FIG. 3.
Figure 5:
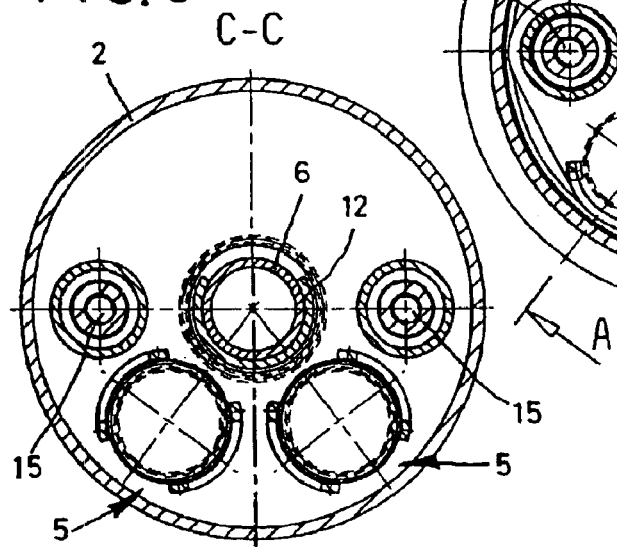
FIG. 5 shows a cross-section of the embodiment of FIG. 3 along line C—C of FIG. 3.

FIG. 3 shows a second embodiment of the innovation in which central component 6 has no retaining claws with the result that filter housing 2 is not provided with any undercuts, and fabrication of filter housing 2 is accordingly less expensive and simpler than in the embodiment of FIG. 1. In this case, the projection engaging central component 6 is formed by retaining component 10. This retaining component 10 is a combination component that includes a base plate, and multiple functional elements located on the base plate. The multiple functional elements can include valve assemblies 5, a fitting or clip 12, and one or more screw holes, each screw hole being located a respective depression 16 formed in the base plate. The fitting 12, and as FIGS. 4 and 5 show, does not exhibit a polygonal contour. It extends downward over collar 14 on central component 6 such that here too central component 6 engages a projection which is fixed in place on filter housing 2, this projection being, however, formed by fitting 12 with a roughly C-shaped cross-section to form a clip, of retaining component 10, and this retaining component 10 includes a base plate 11 which supports valve assemblies 5 and screws 15. The screws extend through holes located in respective depressions formed in the base plate by which retaining component 10 is fastened to filter housing 2. Due to this screw attachment, the projection formed by fitting 12 which engages central component 6 is similarly a filter-fixed or housing-integrated projection.

Base plate 11 of retaining component 10 has two depressions 16 which can accommodate the screw heads of screws 15. This design ensures the vertical mobility of retaining component 10 relative to filter housing 2, the screw head forming a stop for depression 16 such that retaining component 10 is permanently attached to filter housing 2.

If valve assembly 5 is intended, for example, to act as a drain valve, as shown in FIG. 3, spring 17 can lift base plate 11 and thus entire retaining component 10 from an operating position to a disassembly position after cap 3 is unscrewed such that the plate-like valve body of valve assembly 5 is lifted from its valve seat and any residual oil located within filter housing 2 can be drained with the result that subsequent removal of filter insert 4 may be accomplished with as few drops forming and ms cleanly as possible.

What is claimed is:

1. A fluid filter, comprising a filter housing containing a filter insert, a central, essentially tubular component which extends into an interior of the filter insert, said central component being configured to engage a projection located in the filter housing, said central component further being disengageable from said projection and nondestructively removable from the filter, wherein the central component is retained by a retaining component fastened by a fastener to the filter housing, the retaining component forming the projection and having a mobility relative to the filter housing along said fastener, wherein said filter housing includes an outlet bore for directing filtered fluid out of said housing, wherein a lower end of said central component is disposed in said outlet bore, and wherein said retaining component is configured and arranged to retain the lower end of said central component within said outlet bore.

2. A fluid filter according to claim 1, wherein the retaining component comprises a combination component which includes a base plate, and multiple functional elements located on the base plate.

3. A fluid filter according to claim 2, wherein the fastener comprises a screw having a screw head and the functional elements comprise one or more screw holes, each screw hole being located in a respective depression formed in the retaining component for accommodating the screw head.

4. The fluid filter according to claim 2, wherein the functional element comprises a valve body.

5. The fluid filter according to claim 4, wherein the valve body is located to drain fluid from said filter housing when said central component is in a disassembly position.

6. The fluid filter according to claim 2, wherein the functional element comprises a clip for fixing retaining component to the central component.

7. The fluid filter according to claim 2, wherein the functional element comprises a screw hole for fixing the central component.

8. The fluid filter according to claim 1, said retaining component further comprising a valve body.

9. The fluid filter according to claim 8, wherein said valve body is lifted from its valve seat when said central component is in a disassembly position.

10. The fluid filter according to claim 1, further comprising a spring located to lift said retaining component and bias said retaining component against a head of said fastener.

11. The fluid filter according to claim 10, said retaining component further comprising a valve body.

12. The fluid filter according to claim 11, wherein said valve body is lifted from its valve seat when said central component is in a disassembly position.

13. The fluid filter according to claim 1, further comprising a spring located to lift said retaining component and bias said retaining component away from said filter housing.

14. The fluid filter according to claim 13, said retaining component further comprising a valve body.

15. The fluid filter according to claim 14, wherein said valve body is lifted from its valve seat when said central component is in a disassembly position.

16. The fluid filter according to claim 1, wherein said central component is moved from an operating position to a disassembly position by unscrewing a cap screwed on to said filter housing.

17. The fluid filter according to claim 16, further comprising a spring located to lift said central component from said operating position to said disassembly position.

* * * * *